United States Patent
Hayes et al.

(10) Patent No.: US 12,518,303 B2
(45) Date of Patent: Jan. 6, 2026

(54) IDENTIFYING FEEDBACK FOR A PICKER FOR AN ONLINE CONCIERGE SYSTEM AFFECTED BY EXTERNAL CONDITIONS

(71) Applicant: Maplebear Inc., San Francisco, CA (US)

(72) Inventors: Calder Hayes, Sundridge (CA); Aakash Singh, Toronto (CA); Jaclyn Tandler, San Francisco, CA (US); Alicia Wei, San Francisco, CA (US); Gareth Pennington, Aurora (CA); Shengwen Fang, Vancouver (CA)

(73) Assignee: Maplebear Inc., San Francisco, CA (US)

( * ) Notice: Subject to any disclaimer, the term of this patent is extended or adjusted under 35 U.S.C. 154(b) by 329 days.

(21) Appl. No.: 18/085,458

(22) Filed: Dec. 20, 2022

(65) Prior Publication Data

US 2024/0202784 A1    Jun. 20, 2024

(51) Int. Cl.
*G06Q 10/087* (2023.01)
*G06Q 30/0282* (2023.01)

(52) U.S. Cl.
CPC ....... *G06Q 30/0282* (2013.01); *G06Q 10/087* (2013.01)

(58) Field of Classification Search
CPC .......... G06Q 30/0282; G06Q 10/087
USPC ........................................................ 705/28
See application file for complete search history.

(56) References Cited

U.S. PATENT DOCUMENTS

| | | | |
|---|---|---|---|
| 8,204,799 B1* | 6/2012 | Murray | G06Q 30/0635 705/26.81 |
| 2007/0192215 A1* | 8/2007 | Taylor | G06Q 10/087 705/28 |
| 2008/0301009 A1* | 12/2008 | Plaster | G06Q 10/087 705/28 |

FOREIGN PATENT DOCUMENTS

JP            2016015139 A  *  1/2016   ......... G06Q 30/0253

\* cited by examiner

*Primary Examiner* — Russell S Glass
(74) *Attorney, Agent, or Firm* — Fenwick & West LLP

(57) ABSTRACT

An online concierge system provides orders to a picker who fulfills the order by delivering items from the order to a customer. Customers provide feedback to the online concierge system about pickers, which is used when the online concierge system allocates orders to pickers. In some cases, negative feedback may be caused by conditions external to a picker, such as weather conditions or an inability to access the online concierge system. To avoid penalizing pickers because of external conditions, the online concierge system identifies forgiveness events when external conditions affect order fulfillment. Feedback affected by a forgiveness event is identified by the online concierge system when evaluating pickers. To facilitate matching of feedback to forgiveness events, a forgiveness event table indexes identified forgiveness events to reduce computing complexity and resources, while simplifying addition of new forgiveness events.

20 Claims, 6 Drawing Sheets

| Event Type | Index Identifier | Time Interval | |
|---|---|---|---|
| Geographic 410A | Geographic Region ID 1 415A | Time 1 to Time 2 420A | 405A |
| Retailer 410B | Order ID 1 415B | Time 3 420B | 405B |
| Order Selection 410C | Order ID 2 415C | Time 4 420C | 405C |
| Customer 410D | Order ID 3, Customer ID 1 415D | Time 5 to Time 6 420D | 405D |

IDENTIFYING FEEDBACK FOR A PICKER FOR AN ONLINE CONCIERGE SYSTEM AFFECTED BY EXTERNAL CONDITIONS

BACKGROUND

An online concierge system may receive an order from a customer and route the order to a picker (or "shopper"). The picker fulfills the order by obtaining items in the order from a retailer specified by the order and delivering the obtained items to the customer. Various online concierge systems allow customers to provide feedback about a picker who fulfilled an order for the customer. For example, an online concierge system receives a rating for a picker from a customer, where the rating represents the customer's perception of order fulfillment by the picker. In another example, an online concierge system receives comments or a textual review of a picker from a customer describing the customer's perception of order fulfillment by the picker.

An online concierge system may account for feedback, such as ratings, received from customers for pickers when allocating orders to pickers for fulfillment. For example, if a picker has less than a threshold average rating from customers, the online concierge system reduces a frequency with which the picker receives orders or reduces a number of orders identified to the picker as available for fulfillment. However, fulfillment of orders by a picker may be impacted by conditions external to the picker, causing a customer to provide feedback penalizing the picker for how the external conditions affected order fulfillment. For example, if a retailer has limited inventory of an item in an order that prevents a picker from obtaining the item, a customer leaves negative feedback for the picker despite the lack of availability of the item being caused by the retailer. As another example, if weather conditions in a geographic region increase the time for the picker to deliver items to an order, a customer provides unfavorable feedback about the picker because of the weather's effect on the time for the picker to fulfill the order. As feedback an online concierge system receives about a picker may affect the assignment of orders by the online concierge system, negative feedback about the picker caused by external conditions impairing order fulfillment may decrease a number of subsequent orders the online concierge system provides to the picker, which may decrease a picker's willingness to accept further orders from the online concierge system.

SUMMARY

In accordance with one or more aspects of the disclosure, an online concierge system may identify a forgiveness event based on characteristics of an order. A forgiveness event may identify situations where conditions external to a picker fulfilling the order affect the picker's ability to fulfill the order. A condition "external to" a picker may identify one or more conditions affecting fulfillment by a picker that are not caused by the picker and that are unable to be controlled by or mitigated by direct action of the picker. In various embodiments, the online concierge system maintains conditions for characteristics of orders that identify forgiveness events. The online concierge system identifies a forgiveness event in response to characteristics associated with an order satisfying at least a threshold amount of conditions maintained for at least one forgiveness event.

Characteristics associated with an order may include characteristics of a geographic region in which the order is fulfilled, characteristics of a retailer specified by the order, a time when the order was identified to pickers by the online concierge system, a customer from whom the order was received, as well as other information describing an order. Characteristics of a geographic region may identify whether the geographic region experienced severe weather, experienced an outage of a client application associated with the online concierge system, or experienced other conditions potentially impairing fulfillment of an order by a picker. Characteristics of a retailer specified by the order may identify whether the retailer specified by the order had less than a threshold inventory of an item included in the order. A time when the order was identified to pickers may determine whether the picker was capable of selecting the order before a time specified in the order. Characteristics of the customer may indicate whether the customer has provided fraudulent information or previously provided feedback for pickers satisfying one or more conditions. Other characteristics of orders may be used to identify a forgiveness event in other embodiments.

In response to receiving characteristics of an order satisfying a condition for a forgiveness event, the online concierge system stores the forgiveness event as an entry in a forgiveness event table. The entry for the forgiveness event includes an index identifier uniquely identifying the forgiveness event and a time interval associated with the forgiveness event. The time interval specifies a range of times when the forgiveness event affected orders. In various embodiments, the entry also includes a type of the forgiveness event, with the type of the forgiveness event being determined based on a type of characteristics of the order satisfying the condition for the forgiveness event.

With the forgiveness event stored, the online concierge system compares the index identifier to the forgiveness event to characteristics of feedback received for pickers. In response to a characteristic of feedback matching the index identifier, the online concierge system determines whether a time associated with the feedback is included in a time interval for the forgiveness event. In response to the characteristic of feedback matching the index identifier and to the time associated with the feedback being included in the time interval for the forgiveness event, the online concierge system stores an indication in association with the feedback. The indication specifies that a forgiveness event applies to the feedback. In various embodiments, the online concierge system differently processes feedback for which the indication is stored when evaluating a picker. For example, the online concierge system excludes feedback having the stored indication from calculations for a picker based on feedback for the picker.

In some embodiments, the online concierge system presents a notification to a picker associated with stored feedback for which the indication was stored. For example, the client application associated with the online concierge system executing on a picker device includes an interface presenting stored feedback the online concierge system received from customers about the picker. The online concierge system transmits instructions to the client application that displays a notification in the interface in conjunction with the stored feedback, with the notification presented in response to the indication being stored in association with at least some feedback received for the customer. For example, the interface displays an average rating for the picker from feedback received from customers, with a notification displayed in conjunction with the average rating to indicate that the average rating did not include stored feedback for which the indication was stored. In other embodiments, the online concierge system disregards feedback that is associated with the indication when using feedback received for pickers to determine which pickers are presented with orders for fulfillment.

Storing an index identifier and a time range for a forgiveness event allows the online concierge system to more efficiently select feedback to which the forgiveness event applies. Selecting feedback from customers using an index identifier for a forgiveness event reduces the amount of data for a stored forgiveness event and for previously received feedback analyzed by the online concierge system to determine whether feedback is associated with the forgiveness event. Comparing the index identifier for a forgiveness event to a corresponding characteristic—a geographic location or an order identifier—included in stored feedback reduces computational resources for the online concierge system reduces an amount of time to determine whether the feedback is associated with the forgiveness event.

BRIEF DESCRIPTION OF THE DRAWINGS

FIG. 4 is an example forgiveness event table identifying forgiveness events influencing feedback an online concierge system receives for one or more pickers, in accordance with one or more embodiments.

DETAILED DESCRIPTION

Figure 1:
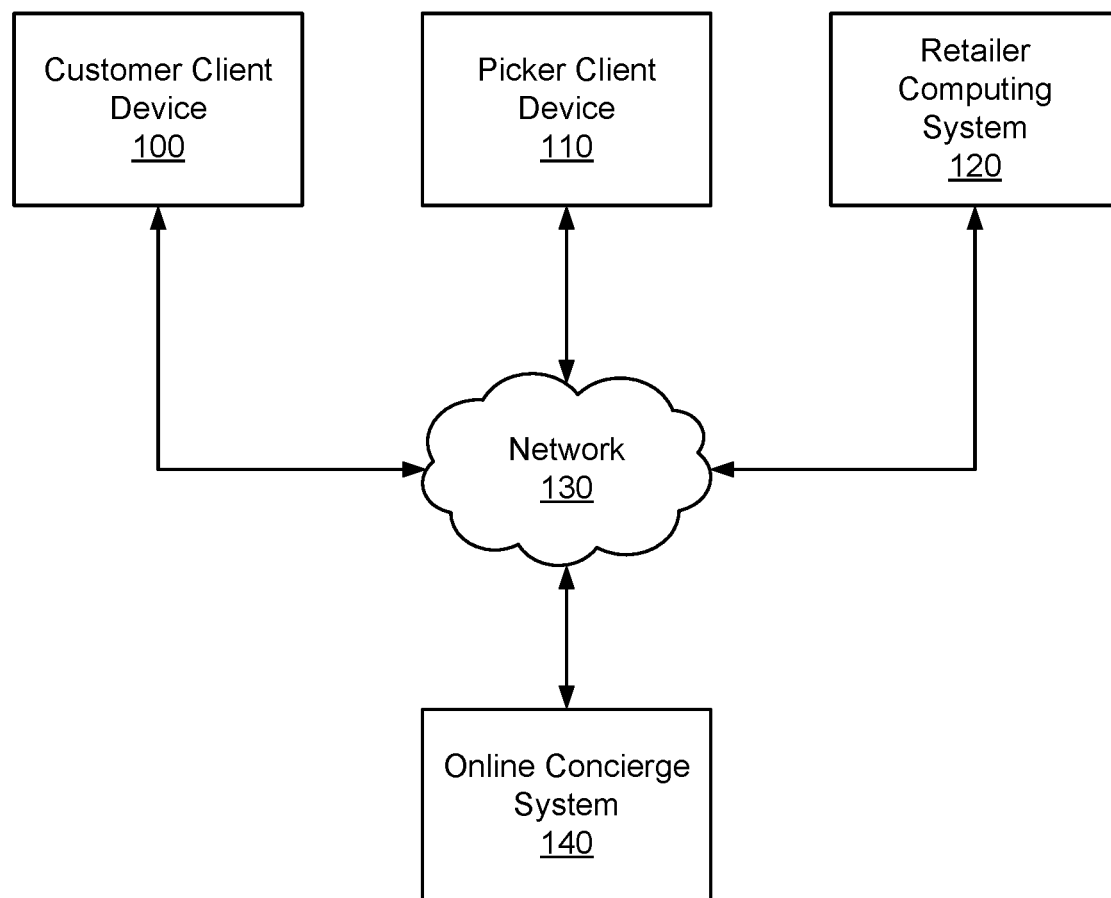
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi or fully autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
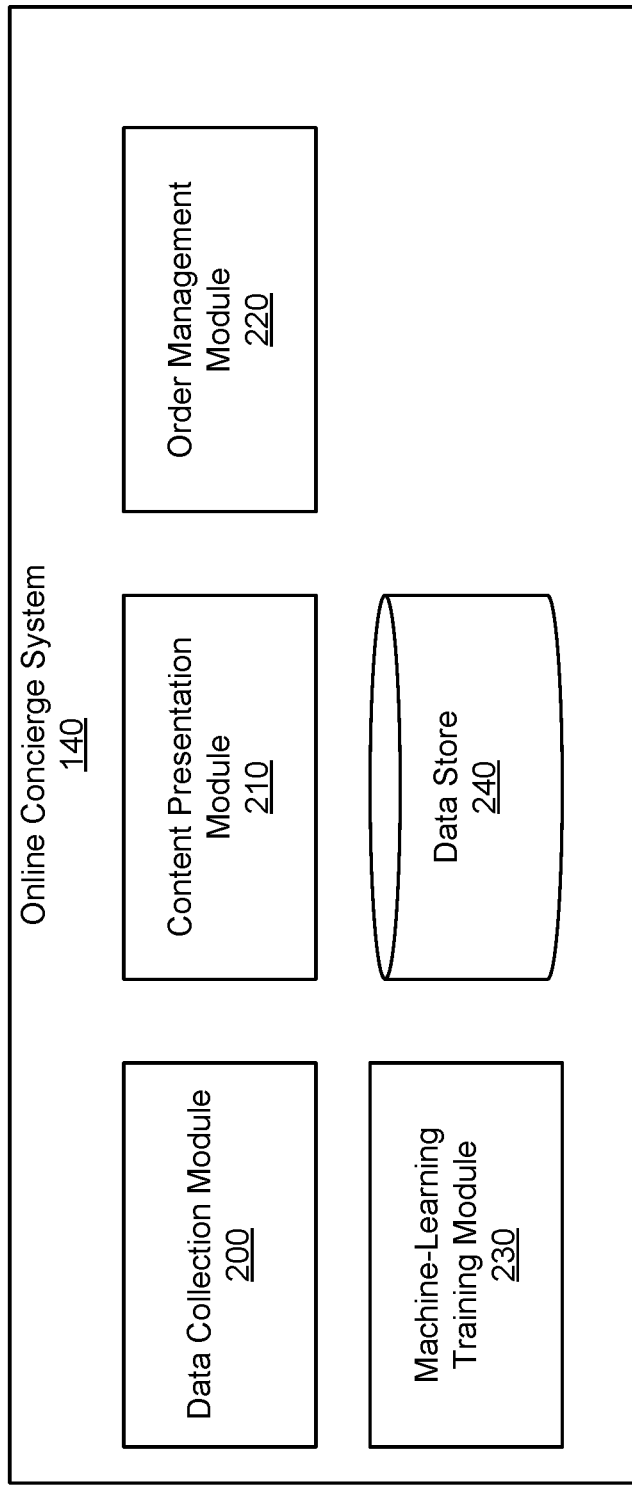
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or feedback the customer gave the delivery of the order (e.g., a rating that the customer gave the delivery of the order).

In various embodiments, the data collection module 200 leverages order data to determine whether feedback received from customers is associated with a forgiveness event. A forgiveness event occurs when conditions outside the direct control of a picker affect order fulfillment by the picker. The data collection module 200 compares characteristics of an order from order data to stored conditions corresponding to one or more forgiveness events, as further described below in conjunction with FIGS. 3-6. In response to characteristics of an order matching a condition for a forgiveness event, the data collection module 200 stores the forgiveness event in a forgiveness event table maintained by the data store 240, as further described below in conjunction with FIGS. 3 and 4. With the forgiveness event stored, the data collection module 200 selects feedback for pickers to which the forgiveness event applies and stores an indication in association with the selected feedback. As further described below in conjunction with FIG. 3, the data collection module 200 performs one or more remedial actions for feedback associated with a forgiveness event when evaluating a picker (e.g., disregarding feedback having the stored indication when averaging or analyzing feedback for the picker).

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data and may use databases to organize the stored data.

Figure 3:
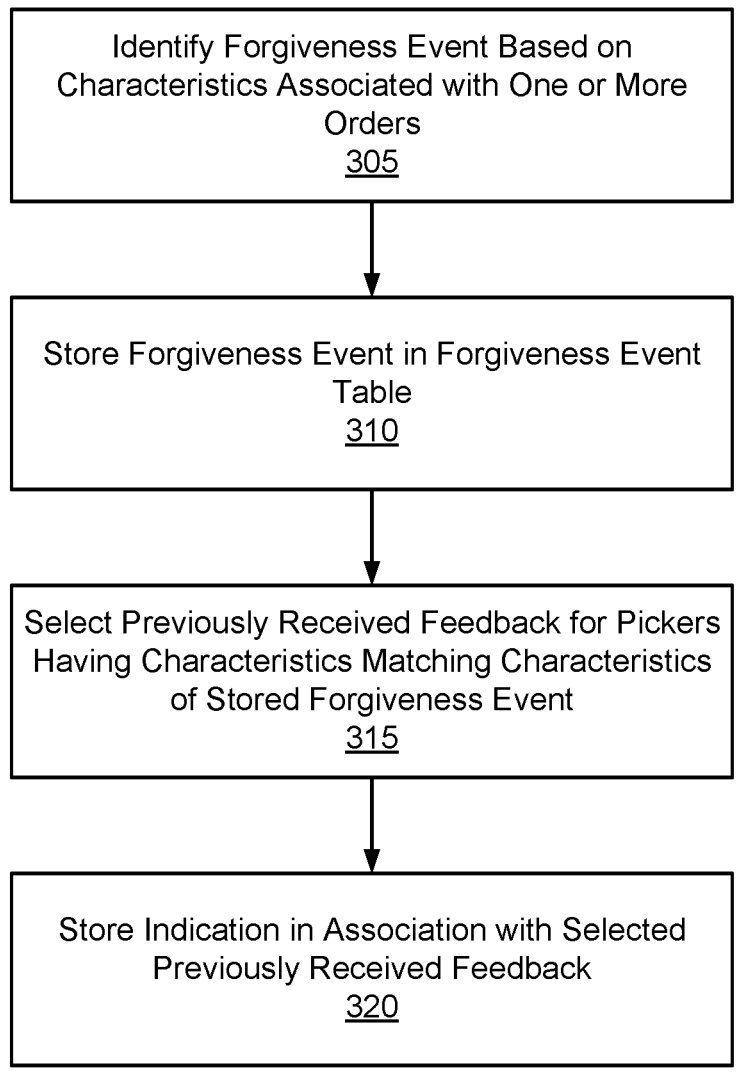
FIG. 3 is a flowchart of a method for identifying feedback an online concierge system receives for a picker that is associated with one or more conditions external to the picker, in accordance with one or more embodiments.

FIG. 3 is a flowchart of a method for identifying feedback received for a picker that is associated with one or more conditions external to the picker, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system 140 without human intervention.

Based on characteristics associated with one or more orders, the online concierge system 140 identifies 305 a forgiveness event that is associated with one or more conditions external to pickers. A condition "external to" a picker identifies one or more conditions affecting fulfillment by a picker that are unable to be controlled by or mitigated by direct action of the picker. In various embodiments, the online concierge system 140 maintains characteristics of orders corresponding to external conditions that identify forgiveness events. The online concierge system 140 identifies 305 a forgiveness event in response to characteristics associated with an order satisfying at least a threshold amount of conditions maintained for at least one forgiveness event. Characteristics associated with an order include a geographic region in which the order is fulfilled, characteristics of a retailer specified by the order, a time when the order was identified to pickers by the online concierge system 140, a customer from whom the order was received, as well as other information describing an order. Hence, a forgiveness event allows the online concierge system 140 to identify situations where pickers' ability to fulfill orders was negatively impacted by conditions that were not caused by the pickers.

Using characteristics of a geographic region in which an order is fulfilled to identify 305 a forgiveness event allows the online concierge system 140 to account for effects from conditions of the geographic region on order fulfillment. For example, a forgiveness event corresponds to weather conditions in a geographic region where an order is fulfilled satisfying one or more criteria. For example, weather data corresponding to a severe weather alert or having at least a threshold number of characteristics associated with a severe weather event is a condition external to pickers identifying 305 a forgiveness event. In another example, a forgiveness event corresponds to pickers within the geographic region in which the order is fulfilled being unable to access a client application for the online concierge system 140 through one or more picker client devices 110. For example, the online concierge system 140 identifies 305 a forgiveness event in a geographic region in response to determining at least a threshold number of pickers are unable to access the client application via picker client devices 110. In another example, the online concierge system 140 identifies 305 a forgiveness event in response to at least a threshold number of pickers in a geographic region being unable to access the client application for at least a threshold amount of time. Other characteristics of a geographic region may satisfy conditions identifying 305 a forgiveness event in various embodiments.

Additionally or alternatively, characteristics of a retailer identified by an order may identify 305 a forgiveness event. For example, an order including an item having less than a threshold inventory at the retailer specified by the order causes the online concierge system 140 to identify 305 a forgiveness event. Accounting for inventory levels of items included in an order allows the online concierge system 140 to account for effects from availability of items at the retailer from which an order is fulfilled on order fulfillment by pickers. In various embodiments, the online concierge system 140 receives a signal or other indication from a retailer identifying one or more items for which the retailer has less than a threshold inventory. In response to a picker selecting an order including at least one item identified by the retailer to the online concierge system 140 as having less than a threshold inventory, the online concierge system 140 identifies 305 a forgiveness event for the order to account for effects of the retailer's inventory level on the picker's capability to fulfill the order.

The online concierge system 140 may also identify 305 a forgiveness event based on timing of when a picker selected an order for fulfillment. For example, the online concierge system 140 may withhold identification of a number of orders to pickers for selection based on order fulfillment times, a number of pickers available for order fulfillment, a number of orders to be fulfilled, or other conditions. While such withholding of certain orders from selection by pickers allows the online concierge system 140 to more efficiently allocate resources, such withholding prevents pickers from fulfilling orders by a time specified by the orders. As the timing of when an order is identified to a picker by the online concierge system 140 affects whether the picker is capable of fulfilling the order by a time specified by the customer, the online concierge system 140 identifies 305 a forgiveness event for an order in response to a picker selecting the order after a time specified by the order for fulfillment. This allows the online concierge system 140 to account for delays in order fulfillment by pickers caused by timing of when the online concierge system 140 identified orders to pickers.

Further, the online concierge system 140 may identify 305 a forgiveness event based on characteristics of the customer for whom an order was fulfilled. For example, customers may provide fraudulent feedback on pickers for order fulfillment or provide other fraudulent information to the online concierge system 140. For example, when the online concierge system 140 determines a user has provided fraudulent feedback (e.g., through manual review of feedback from the customer, through application of one or more machine learned models to feedback received from the customer, etc.), the online concierge system 140 identifies 305 a forgiveness event for one or more orders. For example, the online concierge system 140 trains a model to identity fraudulent information received from customers that is trained through application to labeled training examples, as further described above in conjunction with FIG. 2. For example, each training example includes information (e.g., feedback for a picker) and a label applied to each training example indicating whether the information is fraudulent or is accurate. The model is trained by application to each training example of a set, with an output of the model from application to a training example compared to the label for the training example. The online concierge system 140 scores the output from the model using a loss function that generates a score for the output of the model based on a comparison of the output to the label applied to the training example. The online concierge system 140 updates a set of parameters for the classification model using backpropagation based on the score generated by the loss function. A forgiveness event identified 305 based on determining feedback from a customer was fraudulent event includes an identifier of the customer from whom fraudulent feedback was received and a time interval (e.g., a specific amount of time from a time when the fraudulent feedback was identified). For example, the time interval is a specific amount of time from a time when the forgiveness event was identified 305 or is a specific amount of time from a time when the customer was determined to have provided fraudulent information. The time interval allows the forgiveness event to include feedback received over time from the customer from multiple orders. Similarly, the online concierge system 140 identifies 305 a forgiveness event in response to at least a threshold amount of feedback from a customer satisfying one or more criteria. For example, the online concierge system 140 identifies 305 a forgiveness event in response to a threshold amount of feedback from a customer having less than a threshold score (or less than a threshold average score). The forgiveness event identifies the customer and a time interval. In some embodiments, the time interval is a length of time from when feedback from the customer had at least a threshold score to a current time (or to a time when the forgiveness event was identified 305), so the forgiveness event includes feedback received after a time when the customer most recently provided feedback having at least the threshold score.

Hence, the online concierge system 140 identifies 305 a forgiveness event for orders in a geographic region based on characteristics of the geographic region. Additionally or alternatively, the online concierge system 140 identifies 305 a forgiveness event based on characteristics of a retailer specified by an order or characteristics of a customer from whom the order was received. However, in other embodiments, the online concierge system 140 identifies 305 a forgiveness event in response to other data or characteristics from received orders satisfying one or more conditions.

In some embodiments, the online concierge system 140 automatically identifies 305 a forgiveness event by comparing characteristics of a geographic region, characteristics of an order, characteristics of a customer, or other characteristics to stored conditions associated with forgiveness events. The online concierge system 140 identifies 305 a forgiveness event in response to the comparison indicating characteristics of a geographic region, characteristics of an order, characteristics of a customer, or other characteristics match stored conditions associated with a forgiveness event. Different conditions are stored in association with different types of forgiveness events, allowing the online concierge system 140 to maintain different conditions for different forgiveness events. In other embodiments, the online concierge system 140 identifies 305 a forgiveness event in response to receiving input from a user identifying a forgiveness event.

In response to identifying 305 a forgiveness event, the online concierge system 140 stores 310 the forgiveness event in a forgiveness event table. For a forgiveness event, the online concierge system 140 stores 310 a type of the forgiveness event and one or more index identifiers along with a time interval for the forgiveness event. In various embodiments, an index identifier stored for a forgiveness event is based on a type of the forgiveness event. The type of a forgiveness event is determined from a type of characteristic matching one or more conditions that cause the identifying 305 of the forgiveness event. For example, characteristics of a geographic region in which an order is fulfilled matching conditions for a forgiveness event corresponds to a geographic region type of forgiveness event (e.g., forgiveness event caused by weather related conditions, a forgiveness event caused by a client application), for which the online concierge system 140 stores index identifier of an identifier (or combination of identifiers) of the geographic region in which the forgiveness event was identified. Example identifiers of a geographic region include a unique identifier generated by the online concierge system 140 or a zip code or a postal code of the geographic region. As another example, characteristics of a retailer from which an order is fulfilled matching conditions for a forgiveness event correspond to a retailer type of forgiveness event, for which the online concierge system 140 stores an order identifier of the order for which the forgiveness event was identified 305 as an index identifier. In another example, characteristics of timing when a picker selected the order matching conditions for a forgiveness event correspond to an order selection type of forgiveness event, for which the online concierge system 140 stores an order identifier for the order for which the forgiveness event was identified 305 as an index identifier. As another example, characteristics of a customer for whom the order is fulfilled matching conditions for a forgiveness event correspond to a customer forgiveness event, causing the online concierge system 140 to store a customer identifier or an order identifier for the identified forgiveness event. Storing forgiveness events as entries in a forgiveness event table allows the online concierge system 140 to more easily identify and store 310 information for newly identified 305 forgiveness events.

FIG. 4 shows an example forgiveness event table 400. As shown in FIG. 4, the forgiveness event table 400 includes entries 405A, 405B, 405C, 405D (also referred to individually and collectively using reference number 405). In various embodiments, the forgiveness event table 400 is stored in the data store 240 further described above in conjunction with FIG. 2. Each entry 405 corresponds to a forgiveness event and includes a type 410A, 410B, 410C, 410D (also referred to individually and collectively using reference number 410) of the forgiveness event, an index identifier 415A, 415B, 415C, 415D (also referred to individually and collectively using reference number 415), of the forgiveness event, and a time interval 420A, 420B, 420C, 420D (also referred to individually and collectively using reference number 420) for the forgiveness event.

As shown in FIG. 4, the forgiveness event table 400 includes entries 405 for different types of forgiveness events. In the example of FIG. 4, entry 405A corresponds to a forgiveness event with a type 410A of geographic, so entry 405A has an index identifier 415A that is an identifier of the geographic location where the forgiveness event was identified. A geographic type of forgiveness event indicates that one or more characteristics of a geographic region where one or more orders were fulfilled affected fulfillment of one or more orders in the geographic region. For example, a geographic type of forgiveness event occurs when weather identified for the geographic region has characteristics corresponding to severe weather or when the online concierge system 140 determines at least a threshold amount of pickers in the geographic region were unable to access a client application associated with the online concierge system 140. Additionally, entry 405A has a time interval 420A specifying a starting time and an ending time of the forgiveness event in the geographic location. For example, the time interval 420A specifies a starting time and an ending time for weather conditions in the geographic region having severe weather characteristics or a starting time and an ending time for pickers being unable to access the client application associated with the online concierge system 140.

Similarly, entry 405B corresponds to a forgiveness event with a type 410B of retailer, so entry 405B includes an order identifier of an order identifier affected by the forgiveness event as the index identifier 415B. A retailer type of forgiveness event indicates that one or more characteristics of a retailer from which an order was fulfilled affected a picker's ability to fulfill the order. For example, a retailer type of forgiveness event occurs when an order includes an item having less than a threshold inventory at the retailer. Entry 405B also includes a time interval 420B specifying a time associated with the order identified by the index identifier 415B. In some embodiments, the time included in the time interval 420B is a time when the order corresponding to the order identifier of index identifier 415B was received, while in other embodiments, time interval 420B identifies a time when a picker selected the order or a time when the order was fulfilled.

In the example of FIG. 4, entry 405C corresponds to a forgiveness event with a type 410C of order selection, so entry 405C includes an order identifier of the order for which the forgiveness event was identified as an index identifier 415C. An order selection type of forgiveness event occurs when the online concierge system 140 did not identify an order to one or more pickers for selection until after a time specified by the order (or that the order was not identified to one or more pickers at least a threshold amount of time before the time specified by the order). Entry 405C also includes a time interval 420C specifying a time associated with the order identified by the index identifier 415C. In some embodiments, the time included in the time interval 420C is a time when the order corresponding to the order identifier of index identifier 415C was received, while in other embodiments, time interval 420C identifies a time when a picker selected the order, a time specified by the order, or a time when the order was fulfilled.

Further, entry 405D in the example of FIG. 4 corresponds to a forgiveness event with a type 410D of customer, so entry 405D includes a combination of a customer identifier of a customer from whom an order was received (or from whom feedback was received) and an order identifier as the index identifier 415D. In other embodiments, the index identifier 415D includes the customer identifier without an order identifier. A customer type of forgiveness event occurs when the online concierge system 140 determines a user has provided fraudulent information to the online concierge system 140 or that the user has provided feedback about one or more pickers satisfying one or more criteria, as further described above in conjunction with FIG. 3. Entry 405D also includes a time interval 420D specifying a starting time and an ending time when the customer type of forgiveness event affects orders. The time interval 420D included in entry 405D is determined based on when the customer provided fraudulent information to the online concierge system 140 or when the customer most recently provided feedback about a picker that does not satisfy the one or more criteria (e.g., when the user provided feedback having at least a threshold score).

Referring back to FIG. 3, after storing 310 a forgiveness event, the online concierge system 140 selects 315 previously received feedback for pickers having characteristics matching characteristics of the stored forgiveness event. The online concierge system 140 selects 315 previously received feedback in response to characteristics of the previously received feedback matching an index identifier for the stored forgiveness event and a time associated with the previously received feedback being included in a time interval for the stored forgiveness event. For example, the online concierge system 140 compares a geographic region identifier associated with previously received feedback to an index identifier for the stored forgiveness event. The online concierge system 140 selects 315 the previously received feedback in response to the geographic region identifier associated with the previously received feedback matching the index identifier of the stored forgiveness event and a time associated with the previously received feedback being included in a time interval included in the stored forgiveness event. As another example, the online concierge system 140 compares an order identifier associated with previously received feedback to an index identifier for the stored forgiveness event. The online concierge system 140—selects 315 the previously received feedback in response to the order identifier associated with the previously received feedback matching the index identifier of the stored forgiveness event and a time associated with the previously received feedback being included in a time interval included in the stored forgiveness event. In another example, the online concierge system 140 compares an order identifier and a customer identifier associated with previously received feedback to an index identifier for the stored forgiveness event. The online concierge system 140 selects 315 the previously received feedback in response to the order identifier and the customer identifier associated with the previously received feedback matching the index identifier of the stored forgiveness event and a time associated with the previously received feedback being included in a time interval included in the stored forgiveness event. This allows the online concierge system 140 to automatically select 315 previously received feedback to which a forgiveness event is applicable based on the one or more index identifiers and the time range stored 310 to identify the forgiveness event.

Storing 310 one or more index identifiers and a time range for a forgiveness event allows the online concierge system 140 to more efficiently select 315 previously received feedback to which the forgiveness event applies. Selecting 315 previously stored feedback from customers using an index identifier stored 310 for a forgiveness event reduces the amount of data for a stored forgiveness event and for previously received feedback that the online concierge system 140 analyzes to determine whether the previously stored feedback is associated with the forgiveness event. Comparing the index identifier for a forgiveness event to a corresponding field—a geographic location or an order identifier—included in stored feedback reduces computational resources used by the online concierge system 140 to determine whether the previously stored feedback as associated with the forgiveness event by reducing the data from the stored feedback that is retrieved. This reduction in data retrieval and analysis for stored feedback about orders reduces an amount of time for the online concierge system 140 to select 315 previously stored feedback as associated with a forgiveness event. Further, storing 310 forgiveness events in a forgiveness event table allows the online concierge system 140 to select a forgiveness event and compare various stored feedback to the index identifier of the forgiveness event, allowing more rapid identification of multiple instances of stored feedback associated with the forgiveness event by allowing parallel comparison of different stored feedback to the index identifier of the forgiveness event.

The online concierge system 140 stores 320 an indication in association with selected previously stored feedback. The indication identifies that previously stored feedback is associated with a forgiveness event. In some embodiments, the indication is a flag having a first value when stored feedback is associated with a forgiveness event and having a second, different, value when stored feedback is not associated with a forgiveness event. In other embodiments, the indication is a value stored in association with stored feedback associated with a forgiveness event, while the indication not stored in association with stored feedback that is not associated with a forgiveness event. Storing the indication in association with stored feedback selected 315 as associated with a forgiveness event allows the online concierge system 140 to subsequently account for one or forgiveness events when evaluating feedback received for pickers. For example, the online concierge system 140 disregards stored feedback associated with an indication when evaluating or when aggregating feedback for a picker. As an example, the online concierge system 140 determines average feedback received for a picker, but does not include stored feedback associated with an indication when determining the average feedback. This prevents feedback associated with a forgiveness event from negatively affecting the average feedback determined for the picker. Additionally, the online concierge system 140 prevents stored feedback associated with a forgiveness event from being presented to a picker associated with the stored feedback. This prevents the picker from viewing feedback that was influenced by a forgiveness event.

In other embodiments, the online concierge system 140 performs different actions to stored feedback associated with the indication. For example, the online concierge system 140 increases stored feedback for which the indication is stored 320. In some embodiments, an amount by which stored feedback is increased is based on a type of forgiveness event causing storage of the indication in association with the stored feedback. For example, a geographic type of forgiveness event results in stored feedback being increased by a first amount, while an order selection type of forgiveness event results in stored feedback being increased by a second amount that differs from the first amount. In some embodiments, the online concierge system 140 associates different amounts by which feedback is increased with different types of forgiveness events, determines a type of forgiveness event associated with a stored indication, and increases stored feedback associated with the indication by the amount associated with the determined type of forgiveness event. This allows the online concierge system 140 to mitigate effects of the forgiveness event on the stored feedback.

In some embodiments, the indication stored 320 in association with stored feedback includes a link to details about a forgiveness event associated with the stored feedback. For example, the link retrieves the forgiveness event associated with the forgiveness event, such as an entry in a forgiveness event table corresponding to the forgiveness event. Accessing the link allows a user of the online concierge system 140, or the online concierge system 140, to retrieve details of the forgiveness event associated with the stored feedback.

In some embodiments, the online concierge system 140 presents a notification to a picker associated with stored feedback for which the indication was stored 320. For example, the client application associated with the online concierge system 140 executing on a picker device includes an interface presenting stored feedback the online concierge system 140 received from customers about the picker. The online concierge system 140 transmits instructions to the client application that displays a notification in the interface in conjunction with the stored feedback, with the notification presented in response to the indication being stored 320 in association with at least some feedback received for the customer. For example, the interface displays an average rating for the picker from feedback received from customers, with a notification displayed in conjunction with the average rating to indicate that the average rating did not include stored feedback for which the indication was stored 320.

In various embodiments, the online concierge system 140 uses feedback associated with pickers to select a set of pickers to whom received orders are presented for selection. This allows the online concierge system 140 to increase a likelihood of pickers having positive feedback selecting orders for fulfillment, which increases a likelihood of customer satisfaction for order fulfillment. When selecting the set of pickers to whom orders are presented, the online concierge system 140 disregards feedback associated with the indication. For example, the online concierge system 140 determines an average rating of pickers from received feedback and disregards feedback associated with the indication when determining the average rating for pickers. Disregarding feedback associated with the indication prevents the online concierge system 140 from penalizing the average rating of a shopper based on feedback for a picker that was based on conditions external to the picker that correspond to a forgiveness event. The online concierge system 140 presents one or more of the orders to the set of pickers that was selected based on the received feedback with feedback associated with forgiveness events disregarded.

The method described in conjunction with FIG. 3 allows the online concierge system 140 to automatically select 315 stored feedback when a forgiveness event is identified 305. This allows the online concierge system 140 to select 315 stored feedback that is associated with the identified feedback event based on an index identifier stored 310 for the forgiveness event. Comparing the index identifier for the forgiveness event to characteristics of stored feedback allows the online concierge system 140 to reduce an amount of data retrieved and analyzed to select 315 stored feedback associated with a forgiveness event.

Figure 5:
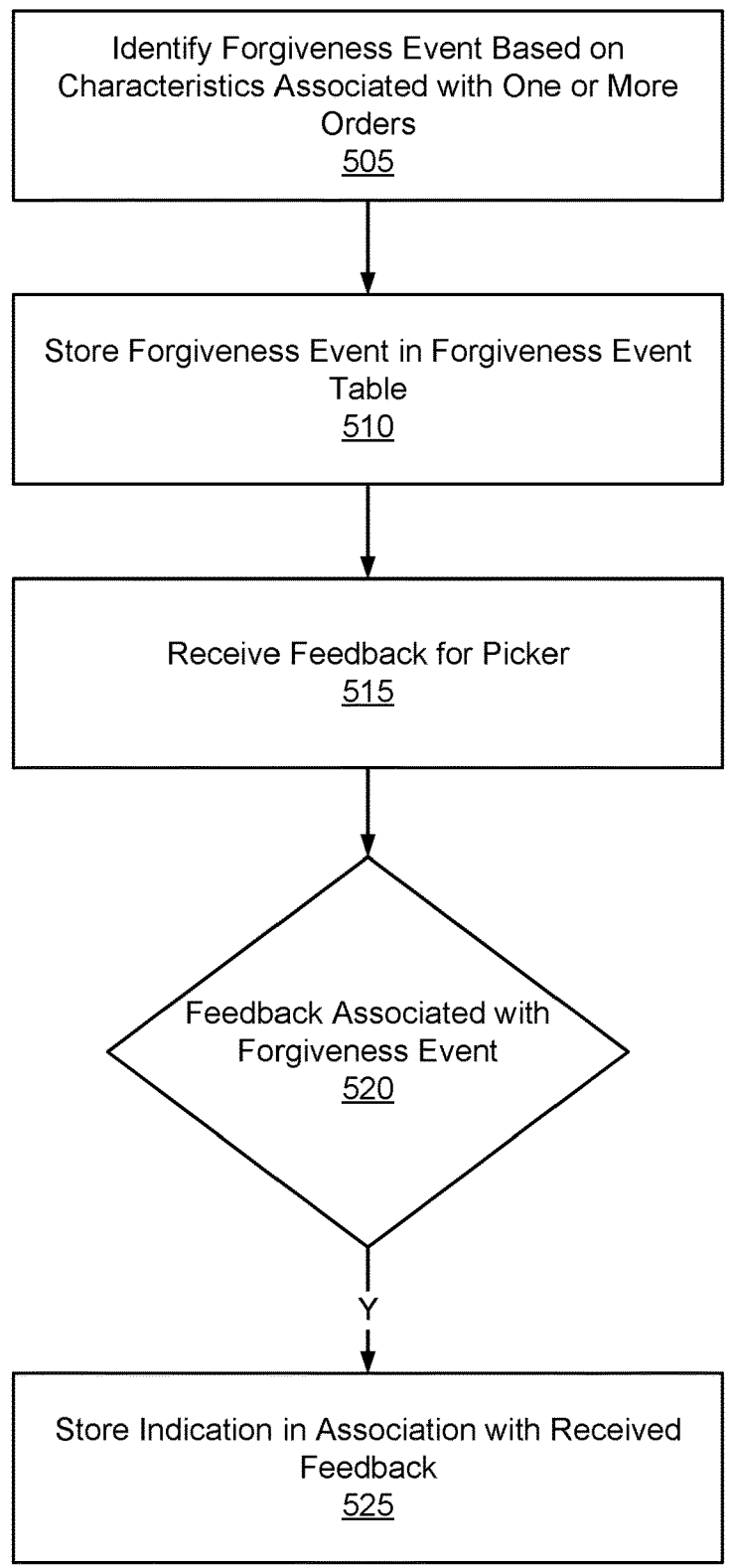
FIG. 5 is a flowchart of a method for identifying one or more forgiveness events associated with feedback an online concierge system receives for a picker, in accordance with one or more embodiments.

Additionally, when the online concierge system 140 receives feedback for a picker or an order, the online concierge system 140 determines whether to associate a stored forgiveness event with the received feedback. FIG. 5 is a flowchart of a method for identifying one or more conditions external to a picker to associate with feedback received for a picker, in accordance with some embodiments. Alternative embodiments may include more, fewer, or different steps from those illustrated in FIG. 5, and the steps may be performed in a different order from that illustrated in FIG. 5. These steps may be performed by an online concierge system (e.g., online concierge system 140). Additionally, each of these steps may be performed automatically by the online concierge system 140 without human intervention.

As further described above in conjunction with FIG. 3, the online concierge system 140 identifies 505 a forgiveness event and stores 510 the forgiveness event in a forgiveness event table. As further described above in conjunction with FIG. 3, the online concierge system 140 identifies 505 the forgiveness event in response to characteristics associated with an order satisfying at least a threshold amount of conditions for a forgiveness event. As further described above in conjunction with FIGS. 3 and 4, the online concierge system 140 stores 510 an index identifier uniquely identifying the forgiveness event and a time interval associated with the forgiveness event in an entry of a forgiveness event table for an identified forgiveness event. As further described in conjunction with FIG. 4, the entry of the forgiveness event table also includes a type of the forgiveness event in some embodiments.

When the online concierge system 140 receives 515 feedback for a picker, the online concierge system 140 determines 520 whether the feedback is associated with a forgiveness event. To determine 520 whether the feedback is associated with a forgiveness event, the online concierge system 140 compares data included in the feedback with entries in the forgiveness event table. For example, the online concierge system 140 compares an identifier of a geographic region included in the feedback with one or more index identifiers included in entries of the forgiveness event table. In response to the identifier of the geographic region included in the feedback matching an index identifier included in an entry of the forgiveness event table, the online concierge system 140 compares a time associated with the feedback to a time interval included in the entry of the forgiveness event table including the index identifier matching the identifier of the geographic region included in the feedback. In response to the time associated with the feedback being included in the time interval included in the entry of the forgiveness event table, the online concierge system 140 determines 520 the feedback is associated with a forgiveness event corresponding to the entry of the forgiveness event table including the index identifier matching the identifier of the geographic region.

As another example, the online concierge system 140 compares a customer identifier included in the feedback with index identifiers of entries of the forgiveness event table. In response to the customer identifier included in the feedback matching an index identifier included in an entry of the forgiveness event table, the online concierge system 140 compares a time associated with the feedback to a time interval included in the entry of the forgiveness event table including the index identifier matching the customer identifier included in the feedback. In response to the time associated with the feedback being included in the time interval included in the entry of the forgiveness event table, the online concierge system 140 determines 520 the feedback is associated with a forgiveness event corresponding to the entry of the forgiveness event table with the index identifier matching the customer identifier. As another example, the online concierge system 140 determines 520 the feedback is associated with a forgiveness event having an index identifier matching an order identifier included in the feedback.

In response to determining 520 the received feedback is associated with a forgiveness event, the online concierge system 140 stores 525 an indication in association with the received feedback, as further described above in conjunction with FIG. 3. Hence, the online concierge system 140 stores 525 the indication in association with the received feedback in response to determining 520 the received feedback is associated with at least one forgiveness event. As further described above in conjunction with FIG. 3, storing 525 the indication in association with received feedback allows the online concierge system 140 to account for the forgiveness event associated with the received feedback. For example, the online concierge system 140 withholds presentation of feedback associated with an indication from a picker associated with the feedback or disregards feedback associated with an indication when averaging feedback received for a picker. However, in response to determining 520 the received feedback is not associated with a forgiveness event, the online concierge system 140 takes no action regarding the feedback in various embodiments. In other embodiments, the online concierge system 140 stores a first value for the indication in response to determining 520 the received feedback is associated with a forgiveness event and stores a different second value for the indication in response to determining 520 the received feedback is not associated with at least one forgiveness event.

Figure 6:
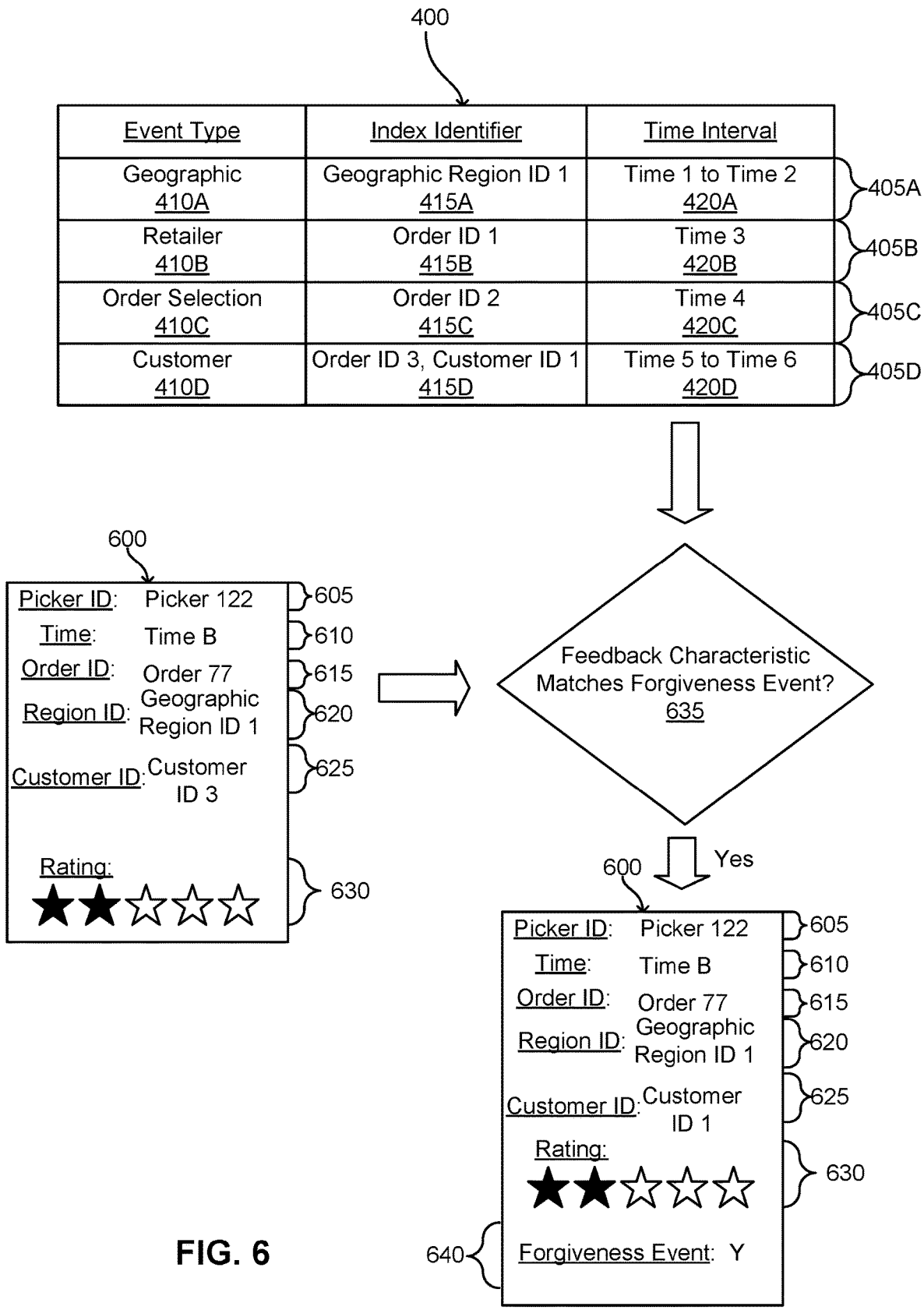
FIG. 6 is a process flow diagram of a method for an online concierge system to associate a forgiveness event with feedback for a picker, in accordance with one or more embodiments.

FIG. 6 is a process flow diagram of a method for an online concierge system 140 to associate a forgiveness event with feedback for a picker. As further described above in conjunction with FIG. 3, a forgiveness event is associated with one or more conditions external to pickers. A condition "external to" a picker identifies one or more conditions affecting fulfillment by a picker that are unable to be controlled by or mitigated by direct action of the picker. As further described above in conjunction with FIGS. 3 and 4, when characteristics of an order satisfy one or more conditions specifying a forgiveness event, the online concierge system 140 stores an entry in a forgiveness table corresponding to the forgiveness event. As further described above in conjunction with FIG. 4, an entry 405 in a forgiveness event table 400 includes an index identifier 415 identifier uniquely identifying the forgiveness event and a time interval 420 associated with the forgiveness event. In some embodiments, the entry 405 of the forgiveness event table 400 also includes a type 410 of the forgiveness event.

The online concierge system 140 also receives feedback 600 for a picker from a customer. The feedback 600 is based on the customer's perception of order fulfillment by the picker. In the example shown by FIG. 6, the feedback 600 includes an identifier 605 of the picker who fulfilled an order, a time 610 associated with the feedback 600 (e.g., a time when the feedback 600 was received by the online concierge system 140, a time specified by the order that was fulfilled, etc.), an order identifier 615 uniquely identifying the order that was fulfilled, a region identifier 620 specifying a geographic region in which the order was fulfilled, and a customer identifier 625 uniquely identifying a customer from whom the feedback 600 was received.

The feedback 600 also includes a rating 630. The rating 630 is a score provided by the customer by the online concierge system 140 that describes a perception of how the picker corresponding to the identifier 605 fulfilled the order corresponding to the order identifier 615. In some embodiments, the rating 630 is a numerical score, while in other embodiments the rating 630 comprises textual comments or other data. In some embodiments, the feedback 600 shown by FIG. 6 is feedback retrieved from a data store 240 by the online concierge system 140, while in other embodiments, the feedback 600 is received from a customer client device 100.

The online concierge system 140 determines 635 whether one or more characteristics of the rating 630 match one or more characteristics of a forgiveness event. In various embodiments, the online concierge system 140 compares different index identifiers 415 from different entries 405 of the forgiveness event tabled 400 to characteristics of the rating 630. For example, the online concierge system 140 compares the index identifier 415 from an entry 405 of the forgiveness event table 600 to the order identifier 615, to the region identifier 620, and to the customer identifier 625 of the rating 630. In the example of FIG. 6, entry 405A has an index identifier 415A matching the region identifier 620 of the rating 630. Hence, the rating 630 was received in connection with an order that was fulfilled in a geographic region corresponding to the geographic region for the forgiveness event identified by entry 405A.

In response to a characteristic of the feedback 600 matching an index identifier 415 of an entry 405 of the forgiveness event table 400, the online concierge system 600 determines whether the time 610 associated with the feedback 600 is included in the time interval 420 of the entry 405 including the matching index identifier 415. In the example of FIG. 6, because the region identifier 620 of the feedback 600 matches the index identifier 410A of entry 405, the online concierge system 140 determines whether the time 610 associated with the feedback is within the time interval 420A for entry 405A. For purposes of illustration, FIG. 6 shows an example where the time 610 associated with the feedback 600 is within the time interval 420A of entry 405A.

In response to determining 625 characteristics of the feedback 600 matching characteristics of an entry 405A of the forgiveness event table 400, the online concierge system 140 stores an indication 640 in association with the feedback 600. The indication 640 specifies that the feedback 600 is associated with a forgiveness event. In some embodiments, the indication 640 includes a link to retrieve the entry 405A of the forgiveness event table 400 corresponding to the forgiveness event. Subsequently, the online concierge system 140 accounts for the indication 640 when evaluating the picker corresponding to the identifier 605 in the feedback 600. For example, the online concierge system 140 does not include feedback 600 in one or more processes evaluating the picker because the indication 640 is stored in association with the feedback 600. This allows the online concierge system 140 to refrain from penalizing pickers based on feedback 600 where conditions external to the picker (i.e., forgiveness events), impaired order fulfillment by the picker.

ADDITIONAL CONSIDERATIONS

The foregoing description of the embodiments has been presented for the purpose of illustration, and many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
   identifying a forgiveness event based on characteristics associated with an order of a plurality of orders, the order being received from a customer associated with a service provided by the computer system, the forgiveness event specifying one or more conditions affecting fulfillment of the order by a picker of a plurality of pickers;
   storing the forgiveness event as an entry in a forgiveness event table, the entry including information specifying a type of the forgiveness event, an index identifier for the forgiveness event, and a time interval associated with the forgiveness event;
   receiving, by the computer system, feedback comprising a negative review about a performance of one or more of the plurality of pickers in fulfilling one or more of the plurality of orders;
   selecting the negative review by matching the index identifier for the forgiveness event to the negative review;
   storing an indication of the forgiveness event in association with the selected negative review; and
   presenting a notification on at least one picker device associated with at least one picker for which the selected negative review was received in response to storing the indication, the notification indicating at least a portion of the negative review previously received for the picker has been forgiven by the computer system.

2. The method of claim 1, wherein identifying the forgiveness event based on characteristics associated with the order received from the customer of the computer system comprises:
    determining that characteristics of a geographic region in which the order is fulfilled satisfy one or more conditions.

3. The method of claim 2, wherein determining that characteristics of the geographic region in which the order is fulfilled satisfy one or more conditions comprises:
    determining that weather conditions in the geographic region satisfy one or more criteria.

4. The method of claim 2, wherein determining that characteristics of the geographic region in which the order is fulfilled satisfy one or more conditions comprises:
    determining that at least a threshold amount of pickers in the geographic region are unable to access a client application associated with the computer system.

5. The method of claim 1, wherein identifying the forgiveness event based on characteristics associated with the order comprises:
    determining that an item included in the order has at least a threshold inventory at a retailer specified by the order.

6. The method of claim 1, wherein identifying the forgiveness event based on characteristics associated with the order comprises:
    determining that the order was not presented to one or more pickers until after a time for fulfillment specified by the order.

7. The method of claim 1, wherein identifying the forgiveness event based on characteristics associated with the order comprises:
    determining that the customer provided fraudulent information to the computer system by applying a trained fraud detection model to information the computer system received from the customer, the model trained by:
        generating a set of training examples, each training example including information and having a label indicating whether the information is fraudulent;
        applying the fraud detection model to each training example of the set to generate an output for the training example;
        scoring the output for the training example using a loss function and the label of the training example; and
        updating one or more parameters of the model by backpropagation based on the scoring.

8. The method of claim 1, wherein identifying the forgiveness event based on characteristics associated with the order comprises:
    determining that at least a threshold amount of feedback on one or more pickers received from the customer satisfies one or more criteria.

9. The method of claim 1, wherein selecting the negative review comprises:
    selecting the negative review by matching the order associated with the negative review to the index identifier for the forgiveness event and the time interval associated with the forgiveness event.

10. The method of claim 1, further comprising:
    receiving additional feedback about one or more pickers from one or more customers; and
    storing the indication of the forgiveness event in association with the additional feedback in response to determining the additional feedback includes information matching the index identifier of the forgiveness event.

11. The method of claim 1, further comprising:
    receiving one or more orders at the computer system for fulfillment;
    selecting a set of pickers to whom one or more of the received orders is presented based on feedback associated with pickers, the selecting disregarding feedback associated with the indication; and
    presenting one or more of the received orders to the selected set of pickers.

12. A computer program product comprising a non-transitory computer readable storage medium having instructions encoded thereon that, when executed by a processor, cause the processor to perform steps comprising:
    identifying a forgiveness event based on characteristics associated with an order of a plurality of orders, the order being received from a customer associated with a service provided by a computer system, the forgiveness event specifying one or more conditions affecting fulfillment of the order by a picker of a plurality of pickers;
    storing the forgiveness event as an entry in a forgiveness event table, the entry including information specifying a type of the forgiveness event, an index identifier for the forgiveness event, and a time interval associated with the forgiveness event;
    receiving, by the computer system, feedback comprising a negative review about a performance of one or more of the plurality of pickers in fulfilling one or more of the plurality of orders;
    selecting the negative review by matching the index identifier for the forgiveness event to the negative review;
    storing an indication of the forgiveness event in association with the selected negative review; and
    presenting a notification on at least one picker device associated with at least one picker for which the selected negative review was received in response to storing the indication, the notification indicating at least a portion of the negative review previously received for the picker has been forgiven by the computer system.

13. The computer program product of claim 12, wherein identifying the forgiveness event based on characteristics associated with the order received from the customer of the computer system comprises:
    determining that characteristics of a geographic region in which the order is fulfilled satisfy one or more conditions.

14. The computer program product of claim 13, wherein determining characteristics of the geographic region in which the order is fulfilled satisfy one or more conditions comprises:
    determining weather conditions in the geographic region satisfy one or more criteria.

15. The computer program product of claim 13, wherein determining characteristics of the geographic region in which the order is fulfilled satisfy one or more conditions comprises:
    determining at least a threshold amount of pickers in the geographic region are unable to access a client application associated with the computer system.

16. The computer program product of claim 12, wherein identifying the forgiveness event based on characteristics associated with the order received from the customer of the computer system comprises:
    determining an item included in the order has at least a threshold inventory at a retailer specified by the order.

17. The computer program product of claim 12, wherein identifying the forgiveness event based on characteristics associated with the order received from a user of the computer system comprises:
  determining the order was not identified to one or more pickers until after a time for fulfillment specified by the order.

18. The computer program product of claim 12, wherein identifying the forgiveness event based on characteristics associated with the order received from a user of the computer system comprises:
  determining the customer provided fraudulent information to the computer system by applying a trained fraud detection model to information the computer system received from the customer, the model trained by:
    generating a set of training examples, each training example including information and having a label indicating whether the information is fraudulent;
    applying the fraud detection model to each training example of the set to generate an output for the training example;
    scoring the output for the training example using a loss function and the label of the training example; and
    updating one or more parameters of the model by backpropagation based on the scoring.

19. The computer program product of claim 12, wherein non-transitory computer readable storage medium further has instructions encoded thereon that, when executed by the processor, cause the processor to perform steps comprising:
  receiving additional feedback about one or more pickers from one or more customers; and
  storing the indication in association with the additional feedback in response to determining the additional feedback includes information matching the index identifier of the forgiveness event.

20. A system comprising:
one or more processors; and
a non-transitory computer readable storage medium having instructions encoded thereon that, when executed by the one or more processors, cause the system to perform steps comprising:
  identifying a forgiveness event based on characteristics associated with an order of a plurality of orders, the order being received from a customer associated with a service provided by the computer system, the forgiveness event specifying one or more conditions affecting fulfillment of the order by a picker of a plurality of pickers;
  storing the forgiveness event as an entry in a forgiveness event table, the entry including information specifying a type of the forgiveness event, an index identifier for the forgiveness event, and a time interval associated with the forgiveness event;
  receiving, by the computer system, feedback comprising a negative review about a performance of one or more of the plurality of pickers in fulfilling one or more of the plurality of orders;
  selecting the negative review by matching the index identifier for the forgiveness event to the negative review;
  storing an indication of the forgiveness event in association with the selected negative review; and
  presenting a notification on at least one picker device associated with at least one picker for which the selected negative review was received in response to storing the indication, the notification indicating at least a portion of the negative review previously received for the picker has been forgiven by the computer system.

* * * * *